(12) United States Patent
Kelesis et al.

(10) Patent No.: US 11,941,141 B2
(45) Date of Patent: *Mar. 26, 2024

(54) METHOD AND SYSTEM FOR ANONYMOUS USER DATA STORAGE AND CONTROLLED DATA ACCESS

(71) Applicant: ALETHOS, INC., Las Vegas, NV (US)

(72) Inventors: George Peter Kelesis, Las Vegas, NV (US); Christian Mendy, Las Vegas, NV (US)

(73) Assignee: Alethos, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,603

(22) Filed: Sep. 26, 2022

(65) Prior Publication Data

US 2023/0124967 A1 Apr. 20, 2023

Related U.S. Application Data

(63) Continuation of application No. 17/024,211, filed on Sep. 17, 2020, now Pat. No. 11,455,414, which is a
(Continued)

(51) Int. Cl.
G06F 21/62 (2013.01)
B64C 27/00 (2006.01)
(Continued)

(52) U.S. Cl.
CPC ........ *G06F 21/6218* (2013.01); *B64C 27/006* (2013.01); *B64C 27/08* (2013.01); *B64C 27/12* (2013.01); *B64C 27/57* (2013.01); *B64D 31/10* (2013.01); *B64D 31/12* (2013.01); *B64D 45/00* (2013.01); *G06F 21/30* (2013.01); *G06F 21/445* (2013.01); *G06F 21/602* (2013.01); *G06F 21/604* (2013.01); *G06F 21/6209* (2013.01);
(Continued)

(58) Field of Classification Search
CPC ...... G06F 21/602; G06F 21/30; G06F 21/445; G06F 21/6209; G06F 21/6218; G06F 21/604; G06F 21/6245; H04L 2209/60; H04L 2463/061; H04L 63/0407; H04L 63/10; H04L 63/061; H04L 63/102; H04L 9/0866
See application file for complete search history.

(56) References Cited

U.S. PATENT DOCUMENTS 5,999,978 A 12/1999 Angal et al.
6,065,051 A 5/2000 Steele et al.
(Continued)

OTHER PUBLICATIONS

Chung, Eric, Joshua Joy, and Mario Gerla. "DiscoverFriends: Secure social network communication in mobile ad hoc networks." 2015 International Wireless Communications and Mobile Computing Conference (IWCMC). IEEE, 2015. (Year: 2015).*

*Primary Examiner* — Michael Simitoski
(74) *Attorney, Agent, or Firm* — Weide & Miller, Ltd.

(57) ABSTRACT

Methods and systems are configured to store user data and control access to the user data, wherein the data is stored remotely from the user (such as external to a user's computing device) and the user's data is maintained anonymously. Content is stored in association with a user identifier and access by third parties is controlled by linked third party identifiers.

10 Claims, 3 Drawing Sheets

Related U.S. Application Data continuation of application No. 15/936,841, filed on Mar. 27, 2018, now Pat. No. 10,796,015.

(60) Provisional application No. 62/478,106, filed on Mar. 29, 2017.

(51) Int. Cl.

| | | |
|---|---|---|
| *B64C 27/08* | (2023.01) | |
| *B64C 27/12* | (2006.01) | |
| *B64C 27/57* | (2006.01) | |
| *B64D 31/10* | (2006.01) | |
| *B64D 31/12* | (2006.01) | |
| *B64D 45/00* | (2006.01) | |
| *G06F 21/30* | (2013.01) | |
| *G06F 21/44* | (2013.01) | |
| *G06F 21/60* | (2013.01) | |
| *H04L 9/08* | (2006.01) | |
| *H04L 9/40* | (2022.01) | |

(52) U.S. Cl.
CPC ........ *G06F 21/6245* (2013.01); *H04L 9/0866* (2013.01); *H04L 63/0407* (2013.01); *H04L 63/10* (2013.01); *B64D 2045/0085* (2013.01); *H04L 63/061* (2013.01); *H04L 63/102* (2013.01); *H04L 2209/60* (2013.01); *H04L 2463/061* (2013.01)

(56) References Cited

U.S. PATENT DOCUMENTS

| | | | |
|---|---|---|---|
| 6,199,157 B1 | 3/2001 | Dov et al. | |
| 6,253,325 B1 | 6/2001 | Steele et al. | |
| 6,314,458 B1 | 11/2001 | Steele et al. | |
| 6,393,468 B1 | 5/2002 | McGee | |
| 6,633,311 B1 | 10/2003 | Douvikas et al. | |
| 6,691,158 B1 | 2/2004 | Pouvikas et al. | |
| 6,889,213 B1 | 5/2005 | Douvikas et al. | |
| 6,952,730 B1 | 10/2005 | Najork et al. | |
| 7,017,109 B1 | 3/2006 | Douvikas et al. | |
| 7,024,451 B2 | 4/2006 | Jorgenson | |
| 7,069,308 B2 | 6/2006 | Abrams | |
| 7,096,355 B1 | 8/2006 | Marvit | |
| 7,117,254 B2 | 10/2006 | Lunt et al. | |
| 7,188,153 B2 | 3/2007 | Lunt et al. | |
| 7,233,997 B1 | 6/2007 | Leveridge et al. | |
| 7,269,590 B2 | 9/2007 | Hull et al. | |
| 7,373,338 B2 | 5/2008 | Thompson et al. | |
| 7,451,161 B2 | 11/2008 | Zhu et al. | |
| 7,478,078 B2 | 1/2009 | Lunt et al. | |
| 7,606,687 B2 | 10/2009 | Galbreath et al. | |
| 7,669,123 B2 | 2/2010 | Zuckerberg et al. | |
| 7,680,882 B2 | 3/2010 | Tiu, Jr. et al. | |
| 7,707,122 B2 | 4/2010 | Hull et al. | |
| 7,725,492 B2 | 5/2010 | Sittig et al. | |
| 7,788,260 B2 | 8/2010 | Lunt et al. | |
| 7,797,256 B2 | 9/2010 | Zuckerberg et al. | |
| 7,809,805 B2 | 10/2010 | Stremel et al. | |
| 7,827,208 B2 | 11/2010 | Bosworth et al. | |
| 7,827,265 B2 | 11/2010 | Cheever et al. | |
| 7,890,501 B2 | 2/2011 | Lunt et al. | |
| 7,933,810 B2 | 4/2011 | Morgenstern | |
| 8,332,345 B1 | 12/2012 | Murphy et al. | |
| 8,364,969 B2 | 1/2013 | King | |
| 8,762,741 B2 | 6/2014 | Chase et al. | |
| 8,996,573 B2 | 3/2015 | Kelesis | |
| 2003/0099360 A1 | 5/2003 | Hoang | |
| 2004/0202117 A1* | 10/2004 | Wilson | H04W 4/10 370/310 |
| 2005/0177385 A1 | 8/2005 | Hull et al. | |
| 2006/0277076 A1 | 12/2006 | Hasan et al. | |
| 2006/0277607 A1 | 12/2006 | Chung | |
| 2007/0130143 A1* | 6/2007 | Zhang | G06F 16/972 |
| 2007/0282877 A1 | 12/2007 | Fischer et al. | |
| 2008/0072039 A1* | 3/2008 | Relyea | H04L 9/3263 713/158 |
| 2008/0132251 A1 | 6/2008 | Altman et al. | |
| 2008/0133658 A1 | 6/2008 | Pennington | |
| 2008/0189399 A1* | 8/2008 | Quoc | H04L 51/48 709/223 |
| 2008/0229211 A1* | 9/2008 | Herberger | H04L 67/75 715/744 |
| 2008/0244721 A1 | 10/2008 | Barrus | |
| 2009/0300723 A1 | 12/2009 | Nemoy | |
| 2010/0146450 A1* | 6/2010 | Harada | G06F 16/168 715/849 |
| 2010/0199098 A1* | 8/2010 | King | H04L 9/3213 713/182 |
| 2010/0205179 A1 | 8/2010 | Carson et al. | |
| 2010/0274859 A1* | 10/2010 | Bucuk | H04L 63/18 709/248 |
| 2010/0306537 A1 | 12/2010 | Cohen | |
| 2011/0010425 A1* | 1/2011 | Bernatz | H04L 51/48 709/206 |
| 2011/0072022 A1 | 3/2011 | Tardif | |
| 2011/0191303 A1 | 8/2011 | Kaufman | |
| 2011/0196935 A1* | 8/2011 | Rideout | H04W 4/21 709/206 |
| 2012/0110332 A1* | 5/2012 | Liu | H04L 9/321 713/170 |
| 2012/0131102 A1 | 5/2012 | Gabos et al. | |
| 2012/0297031 A1* | 11/2012 | Danielsson Fan | H04L 67/1063 709/219 |
| 2013/0191927 A1* | 7/2013 | Miura | G06F 21/10 726/26 |
| 2013/0290711 A1* | 10/2013 | Rajkumar | H04L 9/3226 713/168 |
| 2014/0057701 A1* | 2/2014 | Robbins | G07F 17/3225 463/25 |
| 2014/0164776 A1* | 6/2014 | Hook | G06F 21/6218 713/171 |
| 2014/0195613 A1* | 7/2014 | Ogilvie | H04L 67/10 709/204 |
| 2014/0317699 A1 | 10/2014 | Truong | |
| 2015/0143532 A1 | 5/2015 | Toffa | |
| 2015/0169616 A1* | 6/2015 | Benraz | G06F 11/1658 707/622 |
| 2016/0103981 A1* | 4/2016 | Boss | G06F 21/31 726/7 |
| 2016/0149711 A1* | 5/2016 | Fitzgerald | H04L 9/3268 713/175 |
| 2016/0149873 A1* | 5/2016 | Dickinson | G06Q 20/3829 713/171 |
| 2016/0241389 A1* | 8/2016 | Le Saint | H04L 9/0844 |
| 2016/0241405 A1* | 8/2016 | Jeong | H04L 9/3268 |
| 2017/0053357 A1* | 2/2017 | Bowman | G06F 16/951 |
| 2017/0142158 A1* | 5/2017 | Laoutaris | H04W 12/02 |
| 2017/0193001 A1* | 7/2017 | Agrawal | G06F 40/166 |
| 2017/0372042 A1 | 12/2017 | Isles | |
| 2020/0082121 A1 | 3/2020 | Hanafee | |

* cited by examiner

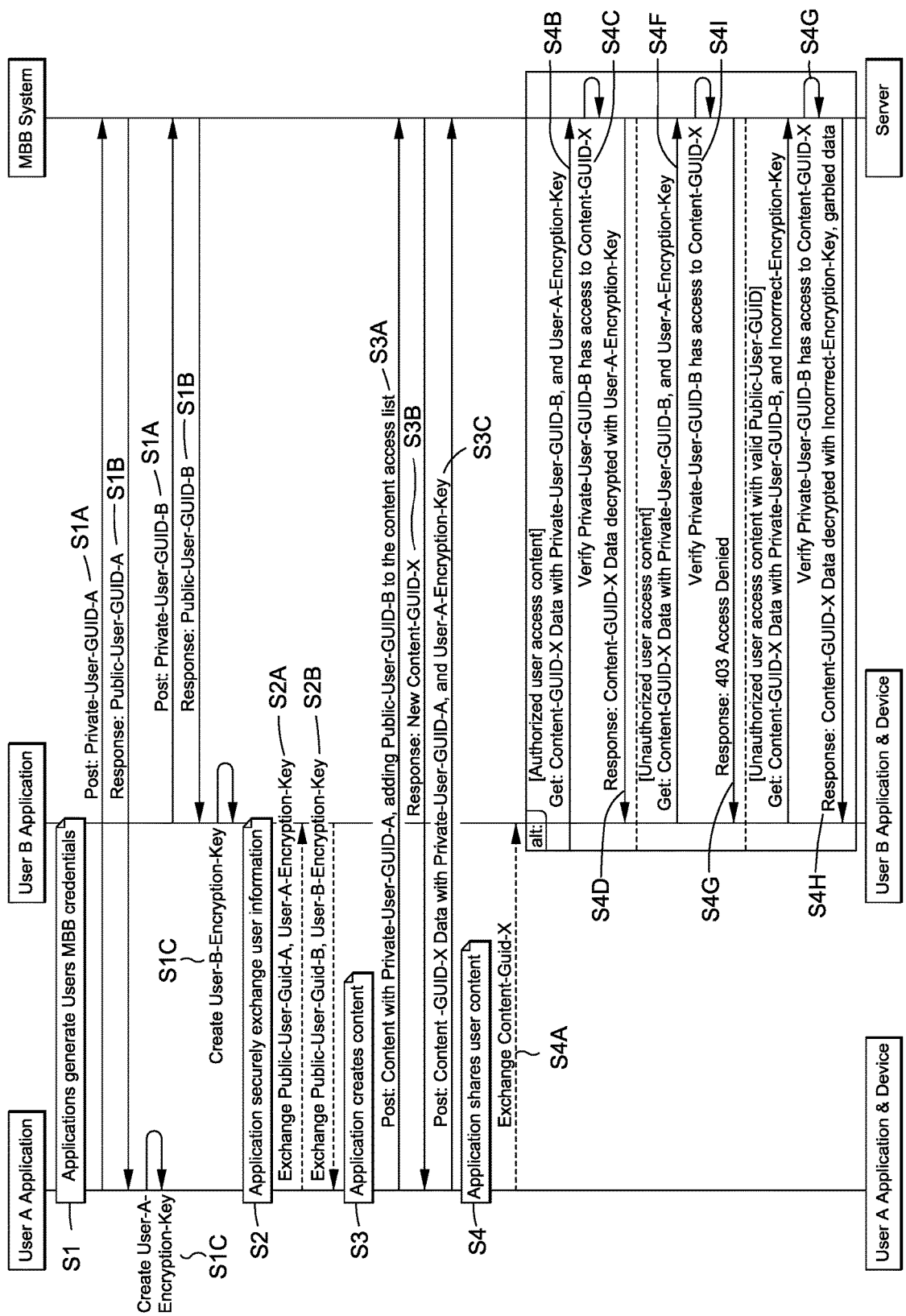

METHOD AND SYSTEM FOR ANONYMOUS USER DATA STORAGE AND CONTROLLED DATA ACCESS

RELATED APPLICATION DATA

This application is a continuation of U.S. application Ser. No. 17/024,211, filed Sep. 17, 2020, which is a continuation of U.S. application Ser. No. 15/936,841, filed Mar. 27, 2018, now U.S. Pat. No. 10,796,015, which claims priority to U.S. Provisional Application Ser. No. 62/478,106, filed Mar. 29, 2017, which prior applications are incorporated herein in their entireties by reference.

FIELD OF THE INVENTION

The present invention relates to systems and methods for storing user data and for controlling access to that data.

BACKGROUND OF THE INVENTION

A wide variety of systems are known for electronically storing user data and allowing access to that data. Various drawbacks exist with known offsite or remote data storage systems from the user's perspective. For example, the user often does not have full control over their data and the identity of the user is known relative to their data. This can cause many problems for the user, such as in the event of a data breach, dispute with the holder of the data or the like.

As one example, users often post data or information to their Facebook® account for their later access or access by friends. One problem is that once the user posts their information, it is not only uniquely tied to them, but they cannot completely remove it from Facebook's system. The user's information is posted as html data and is linked to other data (such as pages or data of the user's friends). Thus, Facebook retains a record of the data as tied to that user and the information may not be completely removed, such as when the user's data is tied or linked to data of other users. There are many other instances where a user would like to be able to store information remotely, selectively allow third parties to access that data, and yet ensure that the information remains anonymous and completely expungable.

SUMMARY OF THE INVENTION

One aspect of the invention comprises a method and system for remotely storing a user's data (e.g. external to a user's computing device, etc.), anonymously. Another aspect of the invention comprises a method and system for controlling third party access to a user's data. Content is stored in association with a user identifier and access by third parties is controlled by linked third party identifiers.

One embodiment of the invention comprises a method of anonymously storing and providing access to a user's data comprising the steps of: receiving, via at least one communication interface of a server comprising a processor and a memory device, a first user private unique identifier; transmitting, from said at least one communication interface of said server to a device of said first user, a first user public unique identifier; receiving, via said at least one communication interface of said server, content from said first user along with said first user's private unique identifier; storing, at said memory device of said server, said content; and receiving, via said at least one communication interface of said server, a designation from said first user of at least one second user who may access said content, said designation including at least a second user public unique identifier.

In one embodiment, the first user's content is encrypted based upon a first user encryption key. A second user may access a first user's content by providing a second user private unique identifier and the first user's encryption key.

In one embodiment of a system, the content is stored at a server and first and second users use remote computing devices. The first and second users may exchange user information, such as their public user identifiers and their encryption keys. The user devices may run applications which generate their user's private unique identifiers and encryption keys.

Further objects, features, and advantages of the present invention over the prior art will become apparent from the detailed description of the drawings which follows, when considered with the attached figures.

DESCRIPTION OF THE DRAWINGS

FIG. 3 illustrates additional flow details of aspects of a method of the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method and system for storing user data and controlling access to the user data, wherein the data is stored remotely from the user (such as external to a user's computing device) and the user's data is maintained anonymously. One application for the principles of the invention is to a journaling system which is disclosed in U.S. Pat. No. 8,996,573, which is incorporated herein in its entirety by reference. As disclosed in that patent, a user may wish to create a journal by uploading information to a remote system. The user may also control access to that data, including sub-parts thereof, to specifically designated third parties.

Figure 1:
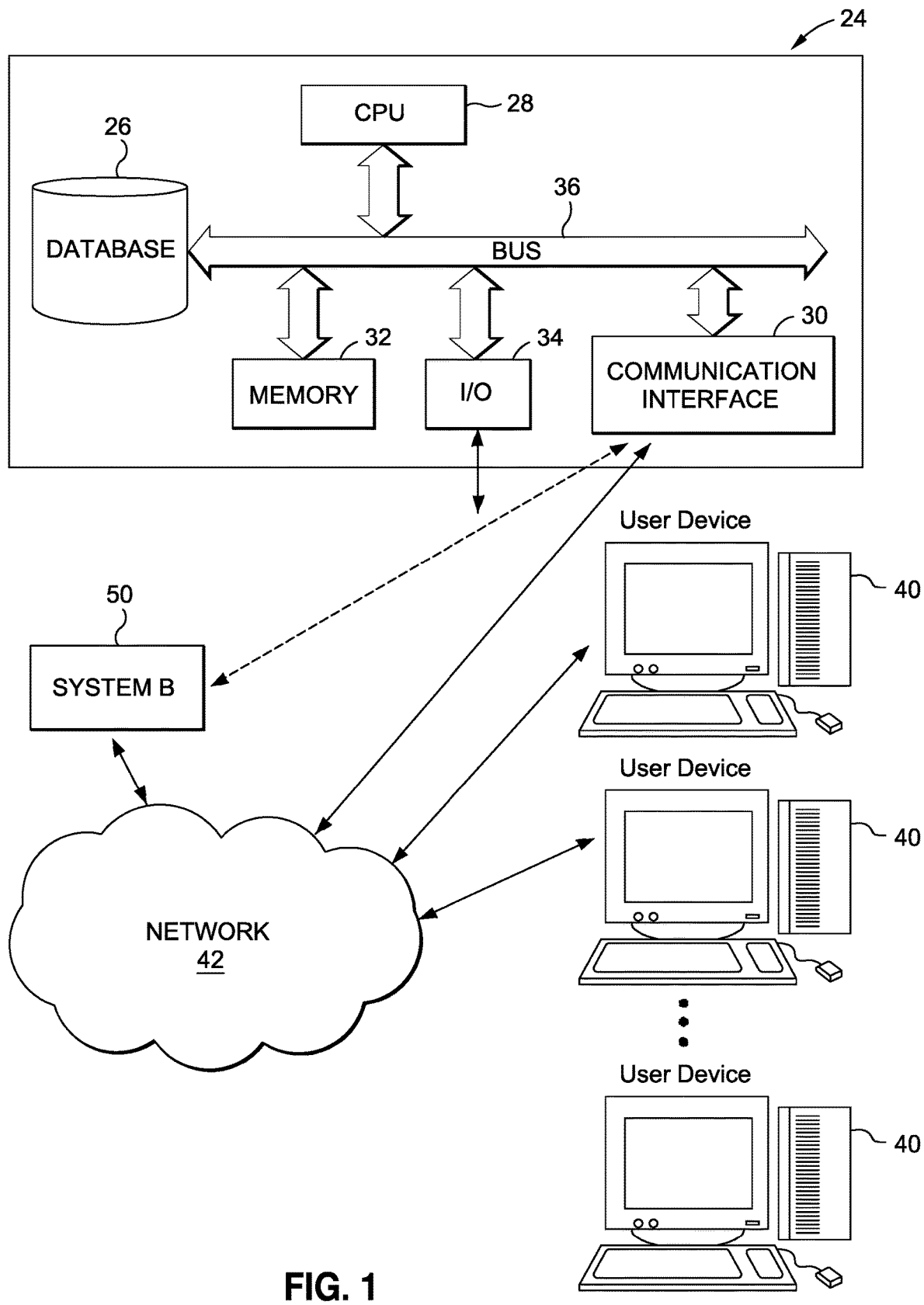
FIG. 1 illustrates one embodiment of a system of the invention.

FIG. 1 illustrates one embodiment of a system of the invention. As can be seen, the system may comprise at least one server 24 capable of receiving user information, storing user information, and selectively controlling access to the user information by one or more third parties. In FIG. 1, the server 24 stores user information in at least one database 26, such as associated with a data storage device (such as RAM, ROM, EPROM, hard drive, flash drive, optical media and associated reader, etc.), although it is noted that the user information may be stored in various forms or formats and in conjunction with various devices. In addition, the database 26 or other storage need not be part of the server 24 but may be data storage that is remotely accessible to the server.

The server 24 preferably comprises a computing-type device. For example, the server 24 may comprise one or more processors 28, at least one communication device or interface 30, and may include one or more additional memory or data storage devices 32 (such as separate from the database 26). In one or more embodiments, the processor(s) 28 is configured to execute one or more instructions, such as in the form of machine readable code (i.e. "software"), to allow the server 24 to perform the functions herein. The software is preferably non-transitory, such as by being fixed in a tangible medium. For example, the software may be stored in the one or more memory devices 32. One or more of the memory devices 32 may be read-only. In addition, the software may be stored on a removable medium in some embodiments. In general, the one or more memory devices 32 are used as temporary storage. For example, the one or more memory devices 32 may be random access memory or cache memory used to temporarily store some user information and/or instructions for execution by the at least one processor 28.

The software may comprise one or more modules or blocks of machine readable code. Each module may be configured to implement particular functionality when executed by the one or more processors 28, and the various modules may work together to provide integrated overall functionality. Of course, in certain embodiments, it is also possible for various of the functionality to be implemented as hardware, i.e. a processor or chip which is particularly designed to implement various of the functionality described herein.

In one embodiment, the server 24 may include one or more input and/or output devices 34, such as a keyboard, mouse, touchscreen, video display or the like, whereby the processor 28 may receive information from an operator of the server 24 and/or output information thereto. This allows, for example, an operator of the server 24 to interface with the server 24 to upgrade, maintain, monitor, etc., the server. In other embodiments, such a user might interface with the server 24 via a separate workstation or other device.

The communication devices or interfaces 30 permit the server 24 to communicate with external devices, networks, systems and the like. As one example, as illustrated in FIG. 1, the server 24 may communicate with one or more user devices 40. The user devices 40 might comprise, for example, computing or communication devices. For example, the user devices 40 may comprise or include a desktop or laptop computer, a tablet, a telephone, a PDA, a kiosk or the like. Preferably, the user devices 40 are capable of receiving user input, transmitting data and receiving data (such as via a communication interface), and displaying information or data, such as via a video display.

The communication interface 30 may permit data to be exchanged between the server 24 and the user devices 40 via one or more communication paths or links (which paths may include WANs, LANS, public or private networks, the Internet, cellular telephone networks or the like). The communication devices 124 may be capable of utilizing various communication protocols, such as TCP/IP, to communicate with a wide variety of other devices, and may communicate over wired and/or wireless links.

In one or more embodiments, user information may be exchanged between the server 24 and one or more user devices 40 via communication with the server 24. For example, a user device 40 may establish a communication link or other communications with a server 24 via the server's communication interface 30. This connection or link may then be used to share or exchange user information between the user device 40 and the server 24. User information may be uploaded to and then stored in the database 26, and/or be downloaded or retrieved from the database 26 during this process. As indicated above, the communications may take place through one or more networks 42, such as shown in FIG. 1.

In one embodiment, the processor 28 and other elements of the server 24 may be linked and thus communicate over one or more communication buses 36. In this manner, for example, the processor 28 may read/receive software from the memory 32 for execution, receive inputs and provide outputs to the various I/O devices 34, receive information from or output information to the communication interface 30, etc.

In one embodiment, each user device 40 also includes at least one processor and at least one memory device which stores software for execution by the at least one processor for implementing aspects of the invention, one or more communication interfaces and one or more I/O devices (such as video display, keypad or touchscreen, etc., as is known in the art relative to desktop and laptop computers, tablets, PDAs, etc.). In the case where the user's device 40 is a mobile communications device, the software may be in the form of an "application" or software application which the user downloads and installs on their device (such as by storing in it the memory). In a preferred embodiment, execution of the software at the server 24 and at the user device 40 causes the processors thereof implement communications comprising the exchange of information or data between the devices, such as in the manner described below.

In one embodiment, the system is configured to allow a user to upload or provide user data to the server 24, such as for storage in the database 26. In addition, the system is configured to allow the user to selectively share, e.g. selectively control access of third parties to, their user data.

One embodiment of the invention will be described with reference to FIGS. 2 and 3. In a step S1, each system user preferably creates user credentials. As illustrated in FIG. 3, this may be accomplished by a user using their user device 40, such as by running the application downloaded thereon. For example, a user might use their user device 40 to link to the server 24 or another server which offers downloads of the software/application (for example, by linking to a server which operates an "app store" or the like). The user might obtain the application for free or might be required to pay for the application. Further, the user might be required to pay one or more fees in order to use the system (whether or not the user paid to obtain the application). As one example, the user might be required to pay a period membership fee, a fee based upon the amount of data uploaded by the user, etc.

The user device application may be configured to generate a private user UUID or GUID (as used herein, the terms GUID and UUID are interchangeable, wherein a UUID refers to a Universally Unique ID or "UUID" and GUID refers to a Globally Unique ID, as Microsoft refers to them; it will be appreciated that other types of unique or relatively unique identifiers and methods for generating them which are now known or later developed, may be utilized) and transmit it to the server 24, as in a step S1A. The user's private GUID may be generated in various manners. In response, in a step S1B, the server 24 may create a public user GUID for the user. That public user GUID is preferably transmitted from the server 24 to the user's device 40. In a step S1C, the user's device 40 preferably utilizes the public user GUID (or other seed value or process) to create a user encryption key which is unique to the user.

It will be appreciated that in other embodiments, the GUIDs may be generated externally. For example, in one embodiment the application running on the user's device 40 might communicate with a remote website or service which generates and/or provides the private GUID, and likewise the server 24 could obtain the public GUID externally. The user's device 40 might also be configured to transmit the public GUID to an external service for generating the user encryption key, such as to minimize the size/complexity of the application running on the user's device 40.

As illustrated in FIG. 3, this process is preferably repeated for each system user, such as User A and User B. In this fashion, each user has their own private GUID, public GUID and user encryption key (each of those being unique relative to all other system users).

Figure 2:
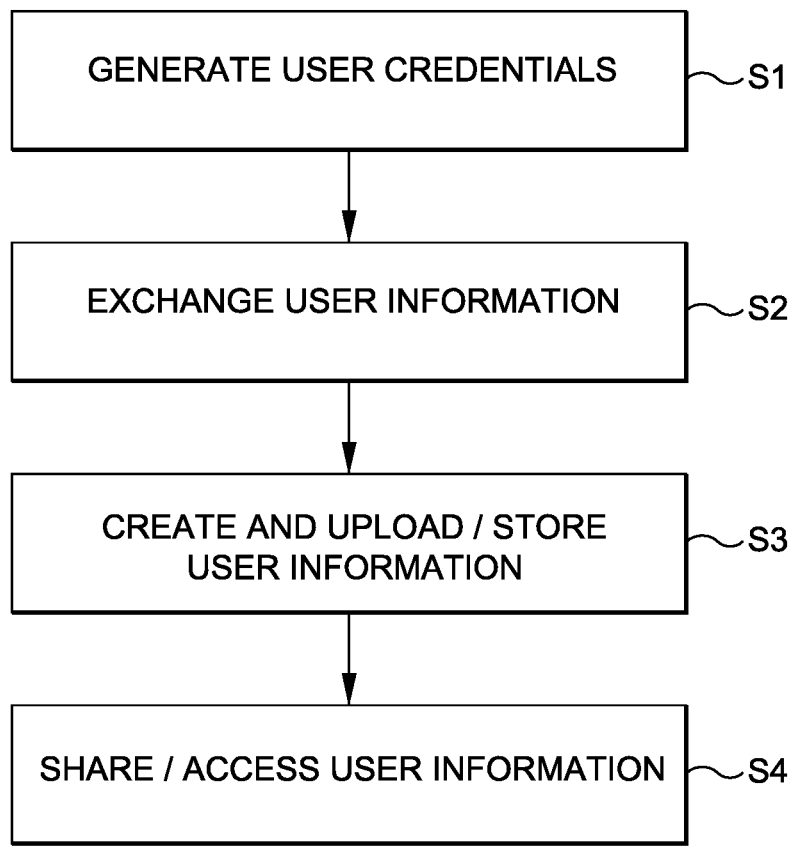
FIG. 2 is a flow diagram of a method of the invention.

As illustrated in FIGS. 2 and 3, in a step S2, system users may exchange their public user GUIDs and encryption keys. This allows, as described below, a second user to access a first user's data or information. For example, as illustrated in FIG. 3, User A may transmit their public GUID and encryption key to a User B in a step S2A. User B may transmit their public GUID and encryption key to User A, as in step S2B. The users may exchange the GUID and encryption key information by transmitting it from their user device 40 to the user device of the other user. This exchange may be facilitated by the server 24, might be accomplished directly between the two devices, or might be facilitated through a third party service/system. For example, a third party system or service might provide a "find friend" service which allows users to conduct searches for friends, acquaintances or the like. Once found, the service may provide a link or other contact information which allows one person to contact the other, such to as facilitate the exchange of this information.

In a step S3, a user may generate and upload or store user content or information. The user may create content in various manners, such as via various applications or tools. For example, the content might comprise text, images, video, etc. In some cases the content may simply created by input into an interface or GUI at the user's device 40 (for example, by typing text into it). In other cases, files or the like may be created and then uploaded, such as via an interface or application. For example, a user might attach an upload an image or video file using their user device 40.

Referring to FIG. 3, in a step S3A, a user preferably uploads user information or content from their user device 40 to the server 24 in conjunction with their private GUID. The server 24 preferably stores the user's content or information in the database 26. In addition, the user designates other users who are permitted to access that content. The user does this by providing or adding the public GUID of the other user(s) relative to that content. The association of the public user GUID of another user serves as an identifier or access authority for that other user to access the user's content. The user can update content access controls at any time, such as to provide additional users with access, remove a previously identified user from the access list, etc. This may be facilitated, for example, via a graphical user interface provided by the application at the user's device (which then transmits updated information to the server 24).

In a step S3B, once the server 24 receives and stores the user's content, it creates a content GUID and transmits that back to the user's device 40. The user then may post that content GUID with their private GUID and encryption key, as in step S3C. In one embodiment, a different content GUID, e.g. GUID-"X" is created for different content which is uploaded or provided by the user. In one embodiment, the user may append, modify, delete, that content. The user can also upload content in groups or blocks, wherein each block of user content is designated to have different third party access. For example, User A might start a daily diary. On Day 1 User A might upload content for that first day along with a designation that User B can access the diary. On Day 2, User A may append the diary with additional content regarding Day 2, which is then also accessible by User B. As another example, User A might upload content regarding a work event and make that content accessible by User B who is a co-worker. User A might also upload content regarding a family vacation and only make that information accessible to a relative, such as User C (and not co-worker/User B).

Importantly, at this point, a user has provided user content or information to the system (and particularly the server 24) for remote storage. Most importantly, the server 24 can identify user GUIDs and stores user content, but has no means for determining what stored content belongs to which user—e.g. the user content is, from the system's perspective, anonymous beyond the fact that it is tied to a private GUID. However, the user's private GUID itself is anonymous to the system—e.g. the identity of the user to whom the GUID belongs is not known to the system.

Referring again to FIG. 2, in a step S4, the user can then selectively share their user content or information with third parties. Preferably, as illustrated in FIG. 3, this comprises a two step processes wherein the user first provides the content GUID to the other user (as in a step S4A) and then the server 24 performs an authorization for the other user to access the content.

As illustrated in FIG. 3, the authorization may comprise the step S4B of the other/accessing user sending (such as from their device 40) to the server 24 a request for access in the form of the content GUID, their private GUID and the other user's encryption key. In a step S4C, the server 24 then verifies that the user has access (in this case, that User B has access to the content of User A). If so, in a step S4D, the server 24 decrypts the content and transmits it to the accessing user. In this example, the server 24 would decrypt the content of User A using User A's decryption key and then transmit it to User B.

As illustrated in FIG. 3, if the accessing user does not have authorization to access the desired content, then access is denied. For example, as illustrated in steps S4E and S4F, User B might attempt to access content of User A and if User A has not authorized User B to access the data (as described above, by User A providing such a designation), then in a step S4F, User's B is denied access to the content of User A by the server 24. In this case, the server 24 may send an "access denied" message to User B's device, as in step S4G.

As illustrated in FIG. 3, if the accessing user does have authorization to access the desired content, but does not have the required encryption key, then the server 24 may provide requested content, but it will be encrypted/unviewable to the user. For example, in a step S4I, user B might attempt to access content of User A using the designated content GUID for that content and their private GUID, but the wrong (or missing) encryption key (of User A). In that case, in a step S4I, the server 24 may confirm that User B was designated as an authorized accessing party to User A's content. However, because the wrong encryption key was provided or no encryption key was provided, the server 24 cannot decrypt the User A content and thus may forward encrypted data to User B, but User B would not be able to read/view that content because it is encrypted (see step S4G).

FIG. 2 illustrates an example of the invention which references two users of the system, a User A and a User B. Of course, the system preferably supports any number of users in similar fashion to that described herein relative to User A and User B.

Similar to that described above, a user might control access to their content for purposes of "posting" or adding to that content. Such a principle is described in the above-referenced U.S. Pat. No. 8,996,573, such as where User A might post or upload content and grant access to User B to modify that content, such as by revising or adding to it. In this case, essentially the same methodology as described above may be utilized.

As noted above, in one embodiment a user may run an application on their device 40 which facilitates various of the functionality herein. The application may, for example, cause the processor of the user's device to cause a display thereof to display a graphical user interface. This interface might include information, as well as menus, fields or the like, such as for receiving input from the user. For example, the interface might include a drop-down menu for "add editing user" and "add read-only user", thus allowing the user to add those users who they want to view/read their content vs. those who can edit/modify their content.

In one embodiment of the invention, a user's uploaded content is treated as an object and is assigned a URL. When another party is granted access to the user's content, the accessing party is transmitted a hyperlink (having the embedded URL) which links the accessing user to the content as decrypted by the provided encryption key. Of course, the content could be provided in other manners.

One embodiment of the invention is a novel content access system using key sharing, and particularly, the storing and sharing of private and/or public GUIDs to control access to content, and encryption keys to secure the content. In one embodiment, the GUIDs and encryption keys can be stored on user devices, such as in association with stored key registers.

In one embodiment of the invention, a user controls their content in that they can completely delete their content from the system at any time. In particular, a user can use their private key to access their content in the database 26 and delete it. Because the user's content is simply stored as a URL object, the system simply deletes the "object"—e.g. the user's content, whereby it simply no longer exists. Further, because the user's content is stored as a secure object and the content is not embedded in other content or linked to other content, once the user's content is deleted, no remnants of it still exist.

The system and method of the invention may have other features. For example, as noted above, in one embodiment a user may be required to pay for the application, service or the like. In one embodiment, a user might access (such as via their downloaded application) a payment processing system B 50 (see FIG. 1) which performs payment processing (such as by bank account transfer, credit card processing, PayPal® or the like). In one embodiment, an advantage of having payment processing completed by an external system is that any user identifying information is then not linked to the content storage and access server 24 (or associated system), further ensuring anonymity of the user.

As noted above, the content and storage access server 24 might also be separate from a main service, such as a main service or application. For example, as illustrated in FIG. 1, system B 50 might comprise a service called "My Bitch Book" which is presented as a service which offers users the ability to post and share content with other users, where that service allows users to find other users, etc., and where the content is stored at the system 24 (e.g. system 24 could serve to store and control user data for various different external systems/services).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A server configured to anonymously store and selectively control access to a user's data comprising:
   a processor;
   a memory;
   at least one communication interface; and
   computer readable program code stored in said memory and configured to cause a processor of said server to:
      receive, via said at least one communication interface of said server, a first user private unique identifier from a first user;
      transmit, from said at least one communication interface of said server to a device of said first user, a first user public unique identifier;
      receive, via said at least one communication interface of said server, a second user private unique identifier from a second user;
      transmit, from said at least one communication interface of said server to a device of said second user, a second user public unique identifier;
      transmit, to said first user, said second user public unique identifier;
      receive, via said at least one communication interface of said server, content from said first user along with said first user private unique identifier, an access designation from said first user of one or more third parties that may access said content, said access designation comprising said second user public unique identifier of said second user, and an encryption key of said first user;
      generate a content identifier for said content;
      store, at a memory device of said server, said content as encrypted by said first user's encryption key, in association with said content identifier and said access designation;
      transmit, to said second user, said encryption key and said content identifier for said content;
      receive, via said at least one communication interface of said server, a request to access said content from said second user, said request comprising said second user private unique identifier, said content identifier and the encryption key of said first user;
      validate access of said second user to said content at said server by matching said second user private unique identifier provided by said second user to said second user public unique identifier associated with said content; and
      decrypt said content using said key of said first user and provide access to said content to said second user, when access is validated.

2. The server in accordance with claim 1, wherein said first user encryption key comprises a first portion for encrypting content and a second portion for decrypting content, and wherein said computer readable program code stored in said memory associated with said server is further configured to cause said processor of said server to receive said first portion of said first user encryption key from said first user.

3. The server in accordance with claim 2, wherein said computer readable program code stored in said memory associated with said server is further configured to cause said processor of said server to receive a request by said first user to transmit said second portion of said decryption key to said second user and transmit said second portion of said decryption key to said second user.

4. The server in accordance with claim 1 wherein said access designation from said first user of one or more third parties may comprise a designation of a plurality of different second users.

5. The server in accordance with claim 1 wherein said computer program product stored in association with said server is configured to cause said processor of said server to generate said first user encryption key using at least said first user's first user public unique identifier.

6. The server in accordance with claim 1 wherein said computer readable program code stored in association with said server is configured to cause said progressor of said server to provide access to said content to said second user by transmitting said decrypted content to said device of said second user.

7. The server in accordance with claim 1 wherein said server is configured to transmit, to said second user, said encryption key and said content identifier for said content in response to a request received by said server from said first user.

8. The server in accordance with claim 1 wherein said server is configured to transmit, to said first user, said second user public unique identifier, in response to a request received by said server from said second user.

9. The server in accordance with claim 1 wherein each of said first user private identifier, said first user public identifier, said second user private identifier and said second user public identifier comprise a universally unique ID (UUID) or globally unique ID (GUID).

10. The server in accordance with claim 9 wherein said content identifier comprises a UUID or GUID.

* * * * *